Figure 1:
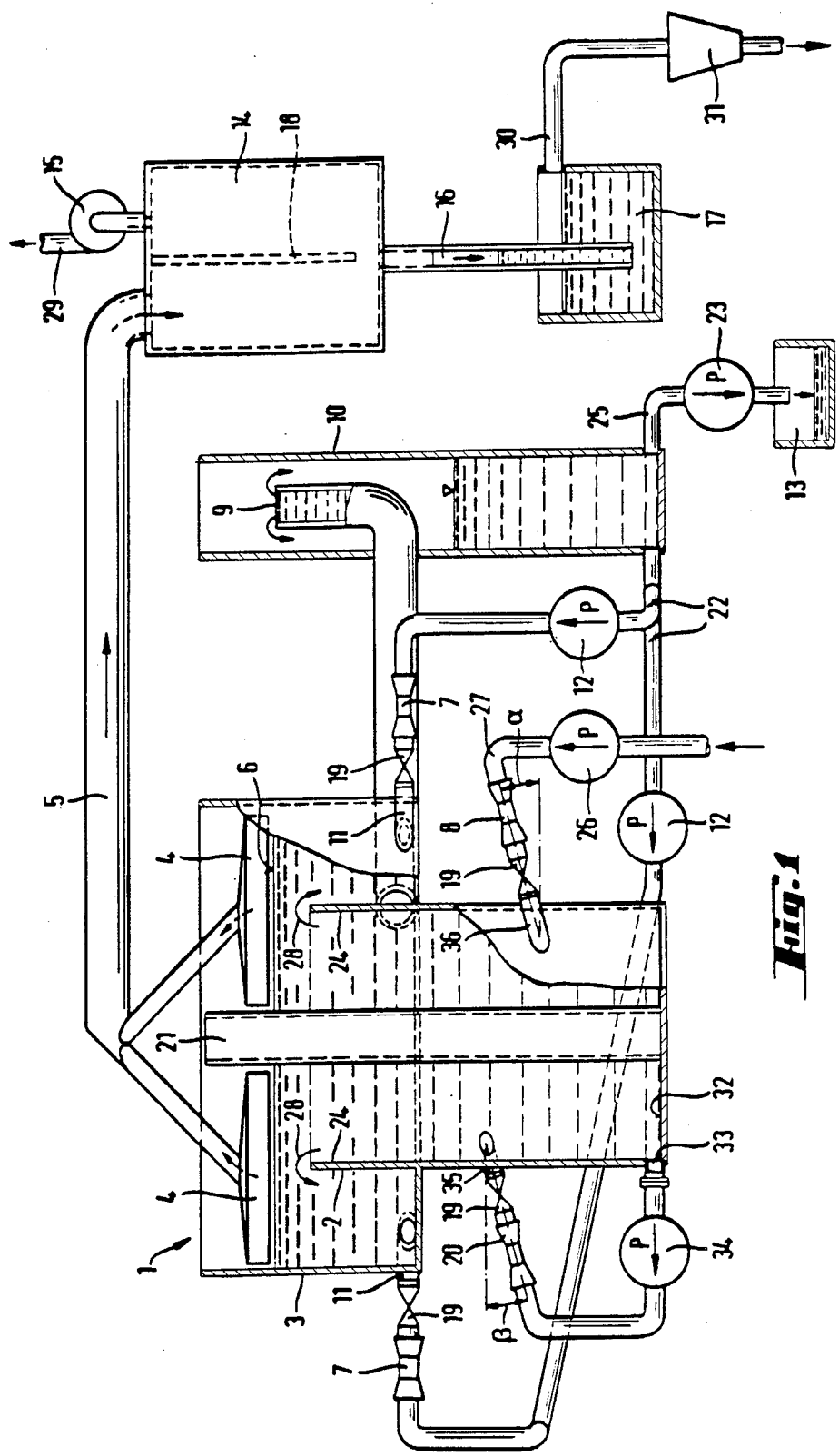

United States Patent [19]

Barnscheidt

[11] Patent Number: 4,722,784

[45] Date of Patent: Feb. 2, 1988

[54] METHOD AND APPARATUS FOR THE FLOTATION OF DISPERSIONS

[75] Inventor: Wolfgang Barnscheidt, Dormagen-Straberg, Fed. Rep. of Germany

[73] Assignee: Feldmuehle Aktienegesellschaft, Duesseldorf, Fed. Rep. of Germany

[21] Appl. No.: 800,075

[22] Filed: Oct. 23, 1985

[30] Foreign Application Priority Data

Feb. 27, 1984 [DE] Fed. Rep. of Germany ....... 3406990
Feb. 26, 1985 [WO] PCT Int'l Appl. ... PCT/DE85/00056

[51] Int. Cl.⁴ .............................................. B03D 1/24
[52] U.S. Cl. ................... 209/164; 209/170; 210/221.2; 261/DIG. 75; 162/55
[58] Field of Search ............... 209/170, 169, 168, 164; 210/221.2; 261/DIG. 75; 162/4, 55, 251

[56] References Cited

U.S. PATENT DOCUMENTS

| | | | |
|---|---|---|---|
| 1,374,447 | 4/1921 | Granawalt | 209/168 X |
| 3,846,299 | 11/1974 | Krasnoft | 209/168 X |
| 3,870,635 | 3/1975 | Clarke-Pownder | 209/168 X |
| 4,157,952 | 6/1979 | Krofta | 209/170 |
| 4,247,391 | 1/1981 | Lloyd | 209/164 |
| 4,331,534 | 5/1982 | Barnscheidt | 209/164 |
| 4,347,127 | 8/1982 | Duttera et al. | 210/221.1 X |
| 4,347,128 | 8/1982 | Barnscheidt | 261/DIG. 75 |
| 4,436,617 | 3/1984 | Moore et al. | 209/170 X |

FOREIGN PATENT DOCUMENTS

| | | | |
|---|---|---|---|
| 2914392 | 10/1980 | Fed. Rep. of Germany | 209/164 |
| 2836496 | 5/1982 | Fed. Rep. of Germany | 209/164 |
| 703922 | 5/1931 | France | |

Primary Examiner—S. Leon Bashore
Assistant Examiner—Thomas M. Lithgow
Attorney, Agent, or Firm—Felfe & Lynch

[57] ABSTRACT

In deinking, the flotation of fiber suspensions is performed in a cylindrical tank 2 to which the fiber suspension is fed through a coupling means 36 as primary stream. The fiber suspension is already aerated and is withdrawn through a suction connection 33 below the coupling means 36 and fed after another aeration through a secondary connection 35 above the coupling means. The volume of the circulated secondary stream is greater than the volume of the primary stream. It is thereby assured that the fiber suspension is aerated at least twice and thus better cleaned.

8 Claims, 3 Drawing Figures

METHOD AND APPARATUS FOR THE FLOTATION OF DISPERSIONS

The invention relates to a method and an apparatus for the flotation of dispersions, especially fiber-containing dispersions, in which the dispersion charged with air is fed as the primary stream into a flotation cell, the froth forming on the surface of the dispersion with the impurities therein contained is carried off, purified dispersion is withdrawn in the bottom area of the flotation cell, recharged with air, and fed as secondary stream in the flotation cell to a point of entry at a level different from that of the first entry.

Such a method is disclosed in DE-PS No. 28 36 496, and a very similar method is disclosed in DE-PS No. 29 14 392. It is common to both methods that a portion of the purified dispersion is circulated and recharged with air for further purification so as to achieve a greater cleaning action.

According to DE-PS No. 28 36 496, a maximum of 50% of the already cleaned, so-called "good stuff" is recirculated and again aerated. According to DE-PS No. 29 14 392, the recirculated amount of good stuff is no more than 150%. The statistical probability that in this process, i.e., in the cleaning of dispersions in a single flotation cell by additional aeration, that is, recirculating the dispersion, the entire dispersion will be twice aerated is, mathematically speaking, impossible.

100% dispersion is fed to the flotation cell, remains in the flotation cell for a while, and then is withdrawn. From this withdrawal, the dispersion amount that is to be recirculated is simultaneously taken, re-aerated, and returned again to the flotation cell. In other words, 150% according to DE-PS No. 29 14 392. Thus, a total of 250% must be withdrawn from the cell, of which 100%, or 2/5 of the entire substance, must be fed to the further processing, while 3/5 of 150% must be re-aerated and returned to the flotation cell. The dispersion, therefore, is aerated 1.6 times, although it is possible that some parts of the dispersion will be aerated only once, but others will be aerated only $2\frac{1}{2}$ times.

By increasing the amount of dispersion that is circulated, the value 1.6 can be increased. The danger remains, however, that some parts of the dispersion will continue to be aerated only once, regardless of how often other parts are aerated. On the other hand, however, the cleaning action of a flotation cell depends on the removal of all impurities with the froth if it is desired to achieve an absolute cleaning action. So, if the purity must satisfy especially high requirements, it has been common practice in the state of the art to connect in series two flotation cells according to the two patents cited above.

It is the object of the present patent application to achieve with a single flotation cell the same effect that could be achieved formerly only with a plurality of cells connected in series, in which case it mattered not whether these units were placed side by side or one over the other, i.e., to assure that the entire dispersion is cleaned by aeration in a flotation cell at least twice.

The solution lies in a method for the flotation of dispersions, especially fiber-containing dispersion, in which the dispersion charged with air is fed as primary stream into a flotation cell, the froth that forms on the surface of the dispersion, with the impurities contained therein, is removed, cleaned dispersion is withdrawn in the bottom area of the flotation cell, recharged with air, and fed as secondary stream at a point of entry situated at a level different from that of the first entry, and has the distinctive feature that a flow rate of more than 100% of the flow rate of the primary stream is circulated as secondary stream and is fed to the flotation cell above the level of entry of the primary current.

According to the prior art, the air-laden primary stream of the dispersion fills the floating cell upon entering it, the air escapes from the dispersion carrying impurities with it and rises in the form of air bubbles. On and in these air bubbles are impurities which are carried off. At the same time the dispersion freed of the air, i.e., the purified material, gathers in the bottom part of the flotation cell. There it is withdrawn, recharged with air, and returned to the flotation cell above the first point of entry. Then the same process occurs, i.e., the air again separates from the dispersion and rises, while the so-called good stuff sinks downwardly, so that, disregarding the further features of the invention, a mixing between primary and secondary stream occurs, with the result that dispersion withdrawn from the bottom area, which is to be delivered to the continuing process, is not aerated twice. According to the invention, the volume of the secondary stream is therefore greater than the volume of the primary stream, i.e., it amounts to more than 100% of the primary stream, so that, upon the withdrawal of the good stuff, which takes place below the feed level of the primary stream, the assurance is obtained that the withdrawn good stuff, i.e., the purified dispersion, has been twice aerated. The larger volume of the secondary stream, i.e., the greater rate of flow, assures that no partial streams can rise upward in the flotation cell, and instead a part of the secondary stream is additionally drawn downwardly in order to assure the recycling of more than 100% of the primary stream. In this manner a blocking action is automatically produced in the flotation cell, which prevents the primary stream from rising above the point of entry of the secondary stream, and thereby assures that the entire amount of the dispersion that is put in is aerated twice.

In order to assure that no mixing occurs between the primary and secondary stream, advantageous embodiments of the invention provide that the feeding of the primary stream is performed horizontally or at a low angle $\alpha$ directed downwardly from the horizontal, and that the feeding of the secondary stream is likewise performed horizontally or at a low angle $\beta$ directed upwardly from the horizontal. The angle $\alpha$ is preferably between 0 and 30 degrees, and angle $\beta$ between 0 and 20 degrees. If both the primary stream and the secondary stream are put in at an angle deviating from the horizontal, it is possible to keep the difference in level between the two points of entry extremely small, and thus to reduce the structural height of the flotation cell. In any case, however, it must be assured that no intersection of the jets of the primary and secondary stream can take place, i.e., either one or both angles are to be made relatively great, or a greater distance is to be provided between the points of entry.

The method is advantageously practiced with an apparatus consisting essentially of a cylindrical tank with a hollow column disposed therein, the cylindrical tank being surrounded in its upper portion by an annular cell which rises above the cylindrical tank and has at least one coupling means for the withdrawal of cleaned dispersion, the cylindrical tank having at least one coupling means for the injection of the primary stream of the aerated dispersion and being characterized by the combination of the following features.

In the bottom portion of the cylindrical tank there is a radially disposed withdrawal connection; the latter is connected by a pump to a likewise tangentially disposed secondary connection, and the secondary connection is disposed above the coupling means for the primary stream.

The distance between the secondary connection and the coupling means is advantageously 200 to 500 mm.

The tangential arrangement of the secondary connection causes a certain rotating movement both upon the aspiration and upon the injection of the dispersion. This rotating movement prevents any separation of the dispersion, although this does not mean that the air bubbles cannot move upwardly.

One very advantageous embodiment of the invention provides for the secondary connection to be connected to a funnel ring disposed on the cylindrical tank below the annular cell.

By arranging the secondary connection on the funnel ring the assurance is obtained that, upon the injection of the secondary stream, especially if, in an additional advantageous embodiment of the invention the funnel ring is separated from the cylindrical tank by a baffle, no mixing of the individual streams of substance will take place. At the same time there is also produced a separation of the rising air bubbles, so that concentric froth rings of different color form on the surface of the fiber suspension, i.e., the inner ring with the air bubbles originating from the primary aeration has a decidedly darker color than the middle ring. The latter in turn is darker than the outside ring where the froth is produced by the countercurrent injectors which perform the third aeration, or, more precisely, an aeration of a partial stream as the third aeration.

The invention will be described below in conjunction with the drawings.

Figure 2:
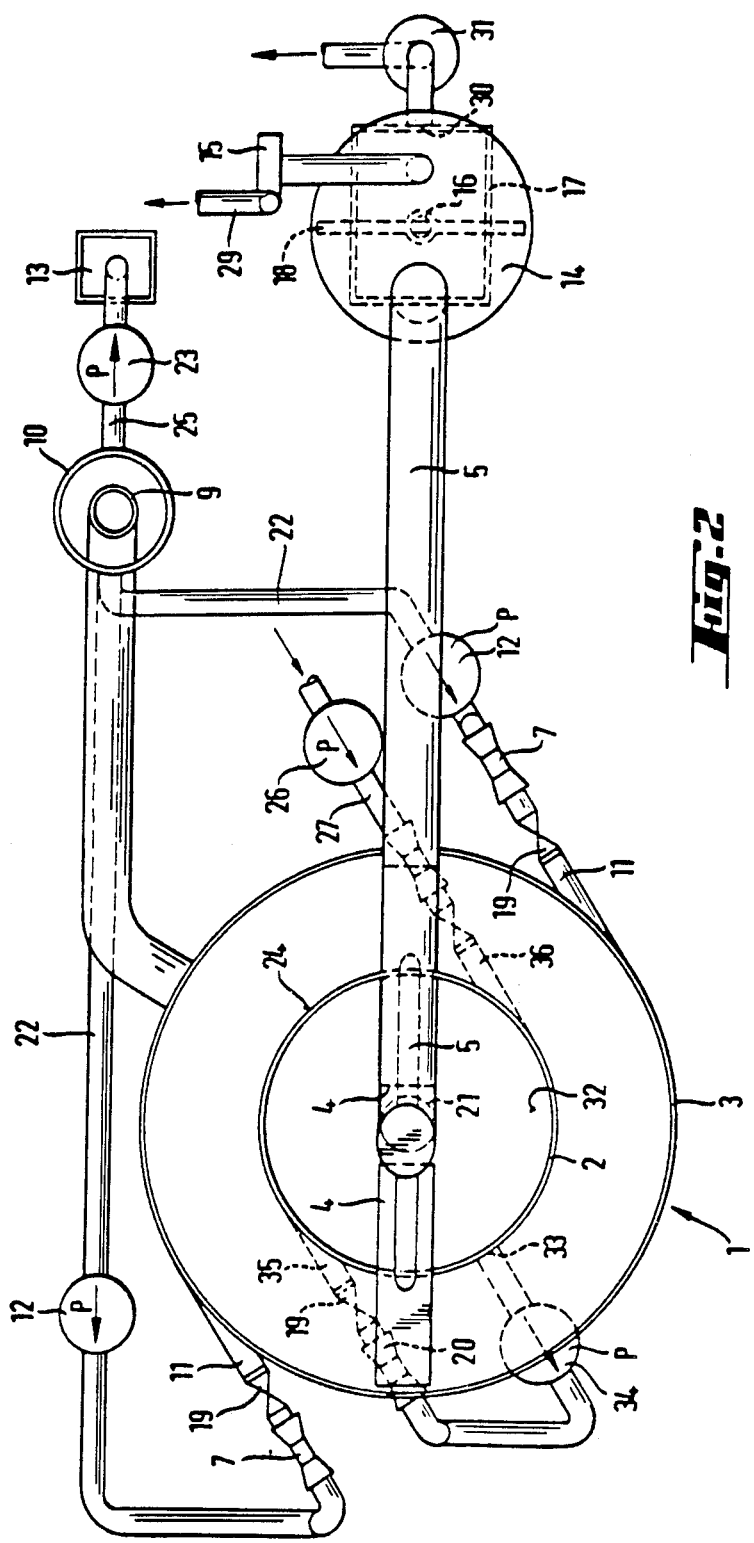
Figure 3:
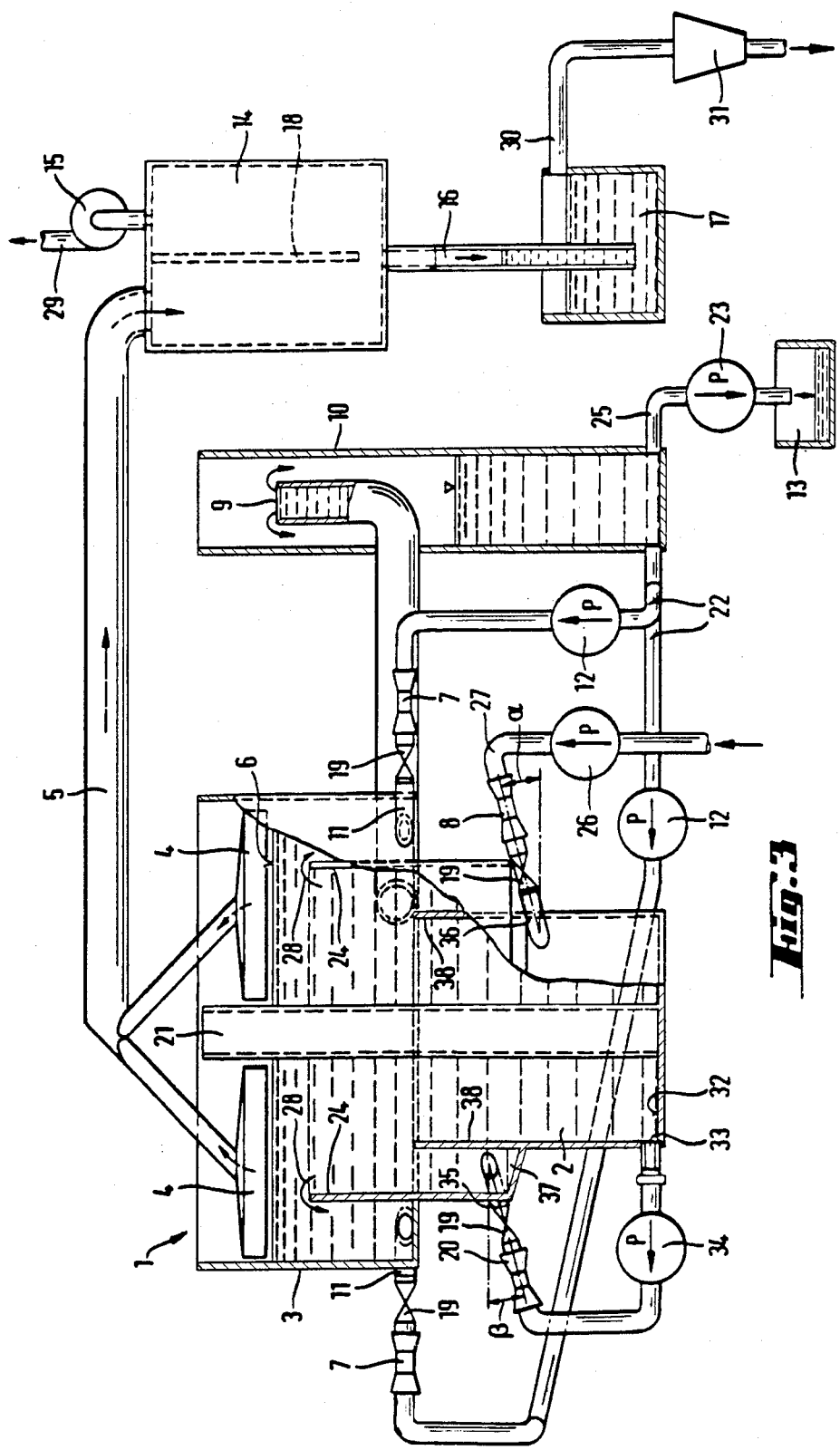

FIG. 1 shows diagrammatically a section through a flotation cell according to the invention, FIG. 2 is the plan view of the same unit, FIG. 3 is a modification of FIG. 1.

By means of the pump 26, fiber suspension, which is a paper waste pulp already chemically and physically disintegrated, is fed as primary stream to the pipeline 27 which connects the pump 26 to the coupling means 36 which bears the injector 8. The coupling means 36 and with it the injector 8 is inclined downwardly from the horizontal by an angle α of 15 degrees, and is situated about 500 mm above the bottom 32 of the flotation cell 1. The fiber suspension is aerated by the injector 8 and rises with the developing bubbles in the cylindrical tank 2 whose center is formed by the hollow column 21, where it passes in the direction of the arrow 28 over the weir 24 formed by the cylindrical tank 2 or by the prolonged wall of the funnel ring 37, and into the annular cell 3. After the annular cell 3 fills up, the fiber suspension rises to a level 6 which is determined by the height of the overflow 9 which connects the annular cell 3 to the overflow tank 10.

A circulation pump 34 connected at the bottom area 32 withdraws more than 100%, generally at least 105%, of the input fiber suspension through the suction coupling means 33 below the connection 36 provided for the primary stream, and it carries this amount, after aeration by circulation injectors 20 which are flanged to the secondary connection 35, back to the cylindrical tank 2. The secondary connections 35 are directed upwardly at an angle β of 15 degrees.

This secondary stream of the fiber suspension, like the primary stream of the fiber suspension, releases air bubbles which rise and to which dirt particles attach themselves. These dirt particles form together with the air bubbles a layer of froth which builds up over the weir 24 and is aspirated by suction nozzles 4 which are disposed on a suction line 5. The suction line 5 terminates in a separator 14 in which a vacuum is produced by a blower 15. The exhaust air leaves the separator 14 through the air exhaust connection 29, the aspirated froth collapses, and precipitates in the bottom part of the separator 14, before is runs through the descending tube 16 into the dirt collector 17. Thus, no froth passes the deflector 18, so that only exhaust air free of froth reaches the blower 15.

In FIG. 3, the flotation cell is represented as a three-stage unit. Underneath the annular cell 3, partially surrounding the cylindrical tank 2, there is disposed an additional concentric ring cell or funnel ring 37 into which the secondary connections 35 lead. The secondary connections 35 enter tangentially into it, so that even with the expansion of the stream, which then comes in contact with the wall 38 of the cylindrical inner surface which thus serves as a baffle wall, separation of the primary stream from the secondary stream is assured.

The dirt collector 17 is connected by an overflow 30 to a thickening station 31, which is usually a combination of centrifuge and filter.

From the overflow tank 10, by means of a counter-current pump 12 connected to the good-stuff line 22, good stuff is withdrawn from the annular cell 3, again aerated through countercurrent injectors 7, and returned to the annular cell 3. The counter-current injectors 7 are disposed tangential to the annular cell 3, so that in the annular cell 3 there develops a certain rotatory movement which continually drives the froth gathering on the surface to the suction nozzles 4.

The good-stuff discharge 25 which likewise is connected to the overflow tank 10 is connected to the good-stuff pump 23 which transports the good stuff to the vat 13 whence it is pumped to the paper machine, which is not shown.

Like the counterflow injectors 7 and the circulating injectors 20, the injectors 8 are separated from the annular cell 3 and the infeed lines by shut-off valves 19. The inclusion of the injectors 7, 8 and 20 between the shut-off valves 19 permits the inspection or cleaning of the injectors 7, 8 and 20 without emptying the cylindrical tank.

I claim:

1. A method for the flotation of dispersions, each of said dispersions containing contaminants and fibers, comprising:

introducing a primary stream comprising dispersion, containing contaminants and fibers, charged with air into a flotation cell at a first level;

carrying away with contaminants contained therein froth forming on the surface of the dispersion;

withdrawing at a flow rate of more than 100% of the flow rate of the primary stream cleaned dispersion in the bottom area of the flotation cell;

charging the cleaned dispersion with air and feeding the cleaned dispersion as a secondary stream to the flotation cell at a point of introduction lying above the first level of the primary stream thereby ensuring that the entire dispersion is cleaned by aeration in the flotation cell at least twice.

2. A method according to claim 1, in which the first feeding of the primary stream comprises feeding the primary stream at a low angle directed downwardly from the horizontal.

3. A method according to claim 1, in which the feeding of the secondary stream comprises feeding the secondary stream at a low angle directed upwardly from the horizontal.

4. Apparatus for the floatation of dispersions containing contaminants and fibers comprising:
- a cylindrical tank with a hollow column disposed therein and an annular open top;
- a first annular cell which surrounds the cylindrical tank in its upper area and which has at least one coupling means for the withdrawal of a clean dispersion said first annular cell being in fluid communication with said cylindrical tank through said annular open top, the cylindrical tank having at least one connection means for the input of a primary stream of aerated dispersion;
- a suction connection radially disposed in the bottom area of the cylindrical tank for the withdrawal of a recycle clean dispersion;
- means to aerate said recycle clean dispersion connected to said suction connection;
- a tangentially disposed secondary connection connected with the means to aerate the recycle clean dispersion and connected with a structure selected from the group consisting of the first annular cell and the cylindrical tank, the secondary connection being disposed above the input connection means for the primary stream thereby ensuring that the entire dispersion is cleaned by aeration in the apparatus at least twice.

5. Apparatus according to claim 4, in which the secondary connection is disposed 200 mm to 500 mm above the input connection of the primary stream.

6. Apparatus according to claim 4, in which the secondary connection is directed upwardly at an angle $\beta$ between 0° and 30° from the horizontal.

7. Apparatus according to claim 4, in which the input connection for the primary stream is directed downwardly at an angle $\alpha$ of 0° to 20°.

8. Apparatus according to claim 4, which includes a second annular cell which surrounds and overtops said first annular cell; said secondary connection being connected to said first annular cell.

* * * * *